United States Patent [11] 3,599,108

[72] Inventor William A. Gardner
Shutesbury, Mass.
[21] Appl. No. 876,831
[22] Filed Nov. 14, 1969
[45] Patented Aug. 10, 1971
[73] Assignee Bell Telephone Laboratories, Incorporated
Murray Hill, N.J.

[54] DISCRETE-TIME FILTERING APPARATUS
10 Claims, 7 Drawing Figs.

[52] U.S. Cl. .......... 333/70 A, 333/70 T
[51] Int. Cl. .......... H03h 7/10
[50] Field of Search .......... 333/29, 70, 70 T, 70 H

[56] References Cited

UNITED STATES PATENTS

| | | | |
|---|---|---|---|
| 2,916,724 | 12/1959 | Peterson | 333/70 T |
| 2,942,195 | 6/1960 | Dean | 333/70 T |
| 2,954,465 | 9/1960 | White | 333/70 T |
| 2,980,871 | 4/1961 | Cox | 333/70 T |
| 3,317,831 | 5/1967 | Marchand | 333/70 |

*Primary Examiner*—Eli Lieberman
*Attorneys*—R. J. Guenther and William L. Keefauver

ABSTRACT: In a discrete-time filter, sensitivity to coefficient variation is substantially reduced by using a unit delay interval, for the delay networks of the filter, which is not equal to the sampling interval. Furthermore, in realizing higher order filter systems, a plurality of such filters may be cascaded, each having a delay interval different from that of the other filters. The periods of repetition of the poles of the overall filter function are therefore different, resulting in improved filter performance.

S-PLANE POLES OF 6th ORDER SAMPLED DATA FILTER

FREQUENCY RESPONSE OF
6th ORDER SAMPLED DATA FILTER

INVENTOR
W. A. GARDNER
BY Gerald E. Murphy
ATTORNEY

S-PLANE POLES OF $6^{th}$ ORDER SAMPLED DATA FILTER WITH UNEQUAL UNIT DELAYS

DISCRETE-TIME FILTERING APPARATUS

BACKGROUND OF THE INVENTION

1. Field of the Invention

This invention pertains to signal-filtering apparatus and, more particularly, to discrete-time signal filters.

2. Description of the Prior Art

The term discrete-time filter encompasses those varieties of filters generally known as sampled data filters and digital filters. The rapid development of integrated circuit technology and the promising potential of large-scale integration of discrete-time circuits has made discrete-time filters, in many cases, more attractive than their analog counterparts, on a cost, size, and reliability basis. Another important advantage of discrete-time filters is their very accurate drift-free operation. Stable filters with very high Q's, or with extremely long time constants, may thus be realized. The ease with which filter characteristics may be altered, moreover, makes discrete-time filters particularly suitable as time-varying filters with adaptive or frequency-tracking responses.

The basic building blocks of a discrete-time filtering system are the first- and second-order filter sections. First-order sections comprise an input-summing network, an output summing network, and one delay unit which is connected to the input and output summing network by a plurality of coefficient multiplier networks. A second-order filter generally comprises an input summing network, an output summing network, and two delay units which are connected to the input and output-summing networks by a plurality of coefficient multiplier networks. A further discussion in detail of discrete-time filters and their properties may be found in Digital Processing of Signals, Gold and Rader, McGraw-Hill, 1969, and Introduction to Continuous and Digital Control Systems, Saucedo and Schiring, MacMillan Co., 1969.

Reference to a discrete-time filter necessarily implies that the input signal be sampled at a predetermined rate, T, prior to its application to the filter. It is well known in the prior art that in the design of such filters, the interval of unit delay introduced by the respective delay units equals the sampling interval. As a consequence of this relationship, discrete-time filters can be highly sensitive to changes in the values of coefficients introduced by the multiplying networks.

It is therefore an object of this invention to overcome this serious limitation of prior art systems.

SUMMARY OF THE INVENTION

This and other objects of this invention are accomplished, in accordance with the principles of this invention, by utilizing my discovery that the unit delay interval of a delay unit in a discrete-time filter of any order need not necessarily be equal to the sampling interval, but may be an integer multiple of the sampling interval. Further, I have discovered that in cascading lower order filters, e.g., second-order filters, to realize higher order filter systems, the unit delay interval used in each lower order section may be different from that of the other sections. Advantageously, this technique alters the period of repetition of the various poles of the filter function with a concomitant improvement in filter response.

Further features and objects of this invention, its nature, and various advantages, will be more apparent upon consideration of the attached drawings and the following detailed description of the drawings.

DETAILED DESCRIPTION OF THE INVENTION

Figure 1:
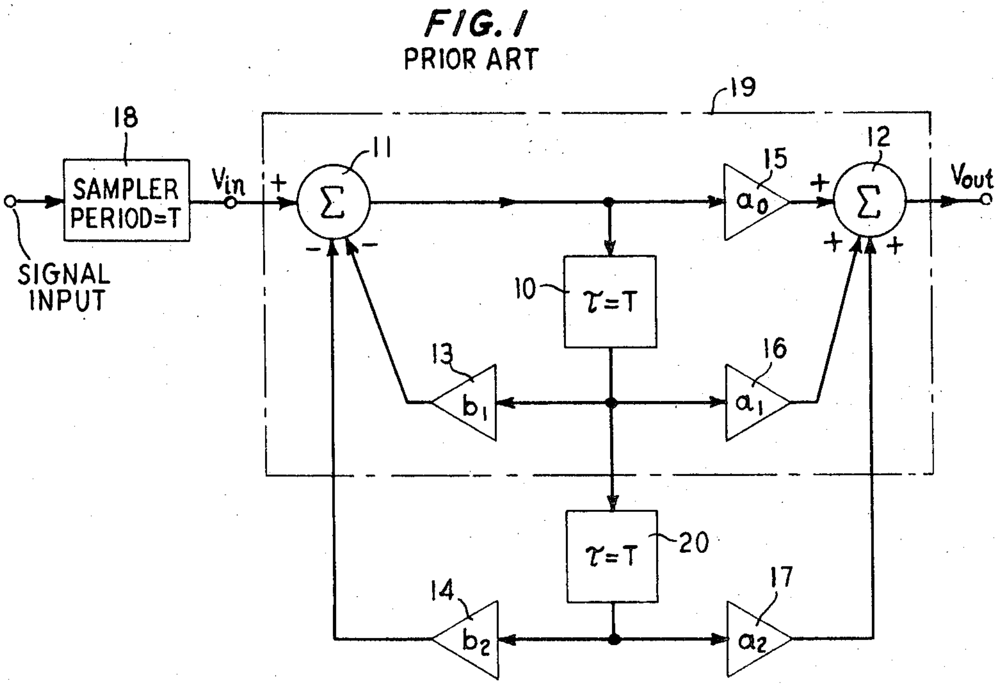
FIG. 1 PRIOR ART
FIG. 1 illustrates a prior art second-order discrete-time filter.

A block diagram of a prior art second-order discrete-time filter is shown in FIG. 1. An input signal, after being sampled by sampler 18 at a sampling frequency 1/T, is applied to summing network 11. Unit delay networks 10 and 20 sequentially delay the signal emanating from summing network 11 by intervals of unit delay $\tau$ equal to the sampling interval T. The coefficients of the filter transfer function, H($s$), denominator are introduced by multiplier networks, i.e., amplifiers, 13 and 14 which respectively multiply the signals emanating from delay units 10 and 20 by coefficients $b_1$ and $b_2$. These multiplied signals are algebraically combined with the sampler 18 output signal in summing network 11. The coefficients of the numerator of the filter transfer function are contributed by multiplier networks 15, 16, and 17, which multiply the various signals applied thereto by coefficients, respectively, of $a_o$, $a_1$, and $a_2$. These multiplied signals are summed in network 12 to develop the desired discrete-time filtered signal. A first-order filter section would comprise the elements enclosed by the broken line block 19. A more detailed discussion of the operation of prior art discrete-time filters may be found in the article entitled "Digital filters," authored by J. F. Kaiser, pages 218 to 285, in System Analysis by Digital Computer, edited by Kuo and Kaiser, John Wiley and Sons, Inc. 2966.

In what ensues, it should be understood that the principles of this invention are applicable to discrete-time filters of any order. The exemplary emphasis of the second-order filter is justified by the fact that it is the fundamental building block of all higher order filters.

The transfer function of a second-order discrete-time filter, such as shown in FIG. 1, may be expressed as:

$$H(s)=\frac{V_{\text{out}}}{V_{\text{in}}}=\frac{a_0+a_1e^{-s\tau}+a_2e^{-2s\tau}}{1+b_1e^{-s\tau}+b_2e^{-2s\tau}} \quad (1)$$

It is generally desired that transfer function H($s$) of a discrete-time filter approximate the transfer function H′($s$) of a conventional analog filter which may be expressed as:

$$H'(s)=\frac{(s-a_n+jB_n)(s-a_n-jB_n)}{(s-a_d+jB_d)(s-a_d-jB_d)} \quad (2)$$

To determine the coefficients $b_1$ (3)

$b_2$ of Eq. (1), e.g., the denominator of $H(s)$ is set equal to zero and the roots ($a+jB$) i.e., the poles of the transfer function, are determined as functions of $b_1$, $b_2$, and $\tau$. Values for $a$ and $B$ are substituted from the desired pole locations of Eq. (2). Thus, it may be shown that:

$$b_1=-2e^{a\tau}\cos(B\tau)$$
$$b_2=e^{2a\tau}. \quad (3)$$

Conversely, it may be shown that, in general, the real, $a$, and imaginary part, $B$, of the poles of a function, defined by Eq. (1), are related to the coefficients $b_1$ and $b_2$ by the following expressions:

$$a=(1/2\tau)ln(b_2)$$

$$B_m=\frac{1}{\tau}\left(\pm\cos^{-1}\left[\frac{-b_1}{2\sqrt{b_2}}\right]\pm2(m-1)\pi\right), \quad (4)$$

where $m$ is any positive integer. $B_1$ corresponds to the conjugate poles nearest the real axis and will hereafter be referred to as $B$. In the interest of simplicity, only the poles of $H(s)$ have been considered. The same principles apply to the zeros of $H(s)$.

From Eq. (4), it is clear that the pole locations of the discrete-time filter are sensitive to changes in the value of the coefficients introduced by the multiplier networks of FIG. 1. Indeed, a classical problem in circuit design is that of parameter sensitivity. The sensitivity of a parameter $x$ to another parameter $y$ is defined as:

$$S_y{}^x=\frac{y}{x}\frac{dx}{dy}=\frac{dx/x}{dy/y} \qquad (5)$$

and is a measure of the percentage deviation in $x$ corresponding to a given percentage deviation in $y$. For example, in an analog filter $x$ might be a coordinate in the $s$-plane of one of the poles of the transfer function and $y$ the inductance of a coil used in the filter. Then, the percentage deviation in the pole coordinate $dx1x$, resulting from a deviation in the value of inductance $dy$, would be approximately:

$$\frac{dx}{x}=S_y{}^x\frac{dy}{y} \qquad (6)$$

The concept of sensitivity is as useful in sampled data filters, as it is in analog filters, since the realized values of the sampled data filter coefficients will deviate from the ideal values, just as do element values in an analog filter. In general, such deviations in element or coefficient values are random variables; hence, the resulting deviations in filter performance as reflected in pole coordinates, frequency response, etc., usually cannot be deterministically predicted or corrected. Accordingly, since sensitivities of the type described reflect the magnitudes of uncorrectable deviations from ideal performance, they are extremely important design parameters. The role of sensitivities in digital filters is somewhat different, since the above-described deviations in coefficient values are not random variables. A realized coefficient value is known precisely, but may deviate from the ideal value due to coefficient quantization error which is the result of approximation bit representation. Hence, deviations in filter performance can be predicted. Thus, the magnitude of the sensitivities, together with the magnitude of the coefficient quantization errors, determine the magnitude of deviations from desired performance of a filter. With regard to sensitivity in both digital and sampled data filters, it can be shown that coefficient accuracy is less critical if a high-order filter is realized as a cascade combination of second-order filters of the type shown in FIG. 1.

Thus, it will be assumed that filter specifications exist in the form of a set of $s$-plane poles and zeros and that it is desired to approximate these with a discrete-time transfer function realized as a cascade of second-order sections, i.e., networks. Using Eqs. (4) and (5), the sensitivity of the pole parameters $a$ and $B$ to the coefficients $b_1$ and $b_2$ may be expressed as:

$$S_{b_1}{}^B=\frac{-1}{B\tau\tan(B\tau)}$$
$$S_{b_2}{}^B=-\tfrac{1}{2}S_{b_1}{}^B$$
$$S_b{}^a=\frac{1}{2a\tau}$$
$$S_{b_1}{}^a=0. \qquad (7)$$

It should be understood that analogous expressions may be derived for the sensitivity of the zero parameters of the transfer function. However, to avoid undue complexity, this disclosure will be generally directed to the sensitivity of the pole parameters rather than the zero parameters of the transfer function $H(s)$. From Eq. (7), it is clear that the defined sensitivities will be quite large if $B\tau$ is small. On the other hand, if $B\pi=\pi/2$, then $S^B_{b_1}$ and $S^B_{b_2}$ reduce to zero and $S^a_{b_2}$ is close to its minimum value. Furthermore, it can be seen from Eq. (4) that $B\tau=\pi/2$ requires that $b_1$ equal zero, resulting in a simplification of the second-order filter of FIG. 1.

Figure 2A:
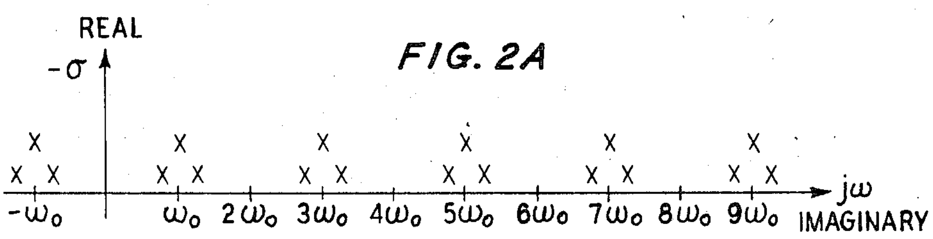
FIGS. 2 and 2B illustrate the pole diagram and frequency response of a discrete-time filter which comprises the cascade connection of three second-order prior art filters.
Figure 2B:
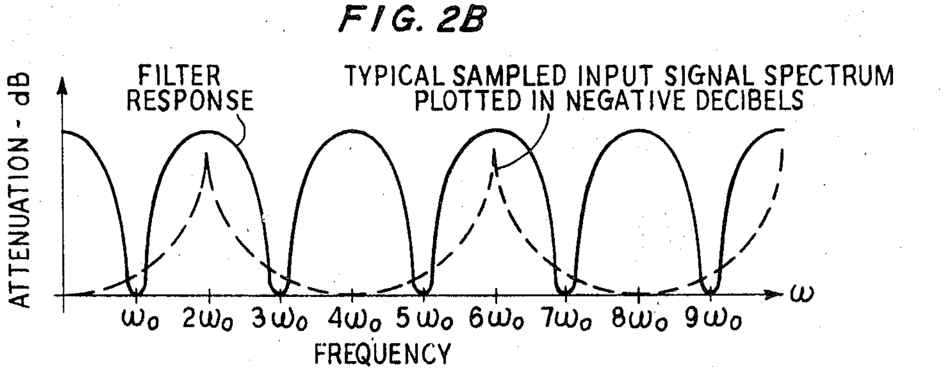

The major drawback of choosing $B\tau=\pi/2$ is that the pole pattern is the $s$-plane will have a periodicity of only $4B$. Undesired higher poles (corresponding to $m$ greater than one in Eq. (4) will occur at frequencies of only $\pm3B$ and $\pm5B$, thereby degrading the degree of apporximation to a second-order analog function with poles at $\pm B$. For example, if a three-pole sixth-order band-pass-type frequency response is approximated with a sampled data filter comprising three second-order sections in cascade, and the unit delay interval of delay units 10 and 20 in each second-order section is equal to $\tau=\pi/2w_o$, i.e., $w_o\tau=\pi/2$, where $w_o$ is the band-pass center frequency approximately corresponding to the mean of the pole locations, then the pole diagram and frequency response of the filter will be as shown in FIGS. 2A and 2B. It is noted that the pairs of pole groupings have a periodicity of $4w_o$ and that the filter response characteristic of FIG. 2B exhibits passbands at these pole locations.

In the prior art, the sampling interval T of the signal applied to the filter is equal to the delay interval $\tau$. Thus, the frequency characteristic of the sampled signal will also have a periodicity of $4w_o$ since the sampling frequency $w_s$ equals $2\pi/\tau$. The frequency characteristic of the sampled signal is indicated by the broken line locus of FIG. 2B. In addition to the desired frequency components centered about $w_o$, there are equivalent frequency components centered about $nw_o$ ($n$ odd), i.e., $3w_o$, $5w_o$, etc. which are passed through the filter. Hence, a filter represented by the pole diagram of FIG. 2A only provides a good approximation to the desired frequency response between the baseband input frequencies of zero and $2w_o$. In order to dispose of the higher frequency components passed by the filter, the output signal of the filter must be processed by an extremely sharp cutoff low-pass reconstruction filter. As is well known, this requirement for a sharp cutoff low-pass filter greatly increases the complexity and cost of the total filtering system.

It has been discovered, in accordance with this invention, that the requirement for a sharp cutoff reconstruction filter may be substantially reduced, while maintaining low coefficient sensitivity, by using a unit delay interval $\tau$ which is not equal to the sampling interval T. The only restriction on $\tau$ is that it must be an integer multiple, i.e., an integral multiple greater than one, of T. Thus, in accordance with the practice of this invention, the sampling interval T may be made much smaller than the delay interval $\tau$. The frequency characteristic of the sampled signal will then be periodic at a higher frequency, forcing undesired frequency components, necessarily, to higher frequencies, and thereby eliminating the need for a sharp cutoff reconstruction filter. Simultaneously, the delay interval $\tau$ may be selected to render the filter less sensitive to coefficient variations.

Figure 3:
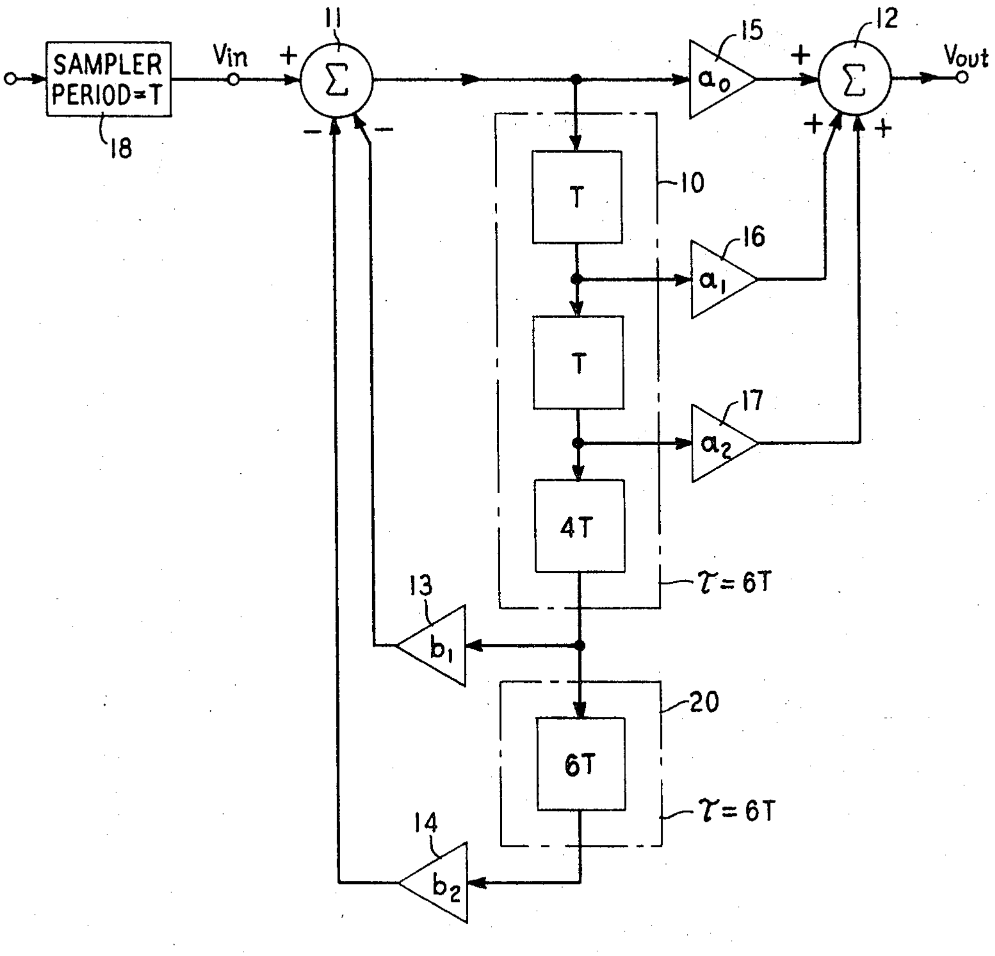
FIG. 3 depicts a second-order discrete-time filter in accordance with this invention.

FIG. 3 illustrates a second-order filter, incorporating the principles of this invention, wherein unit delay networks 10 and 20 have unit delay intervals $\tau$ which are integer multiples, other than one, of the sampling interval T. Of course, any order filter could have been used to illustrate the principles of this invention. A comparison of FIG. 1 and FIG. 3 will indicate that the structure of the filter of FIG. 3 is similar to that of FIG. 1. Accordingly, no complex or expensive structural changes are necessitated. The delay of each unit 10 and 20 is illustratively shown to be 6T, i.e., six times as great as the sampling interval. The multiplying coefficients $b_1$, $b_2$, are determined from Eq. (3) for these new values of $\tau$. Accordingly, the frequency of periodicity of the spectrum of the sampled signal is six times as great as that for the case where the unit delay interval equals the sampling interval and the value of $\tau$ may be independently selected to render the filer less sensitive to coefficient variations. Thus, undesirable frequency components are easily removed by a typical low-pass filter; the sharpness of cutoff required is, evidently, substantially reduced. It is noted further that the input taps for the coefficient multipliers 15, 16, and 17 do not coincide with the input taps of the denominator coefficient components 13 and 14 as they do in FIG. 1. The location of zeros of the transfer function, which are functions of the amount of delay and coefficients $a_o$, $a_l$, and $a_2$, may therefore be independently varied. Accordingly, the zeros of transmission may be strategically located to compensate for undesired attenuation minima introduced by the poles of the filter. It is thus apparent that another degree of design freedom is obtained.

Figure 4:
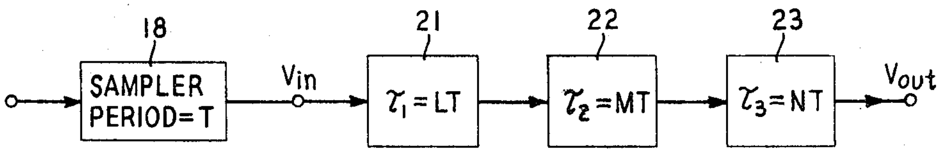
FIG. 4 depicts the cascade connection of a plurality of second-order filters of the type depicted in FIG. 3.

The improved filter of this invention, such as illustratively shown in FIG. 3, may be cascaded with other such filters, as shown in FIG. 4, to obtain a desired higher order transfer function. For purposes of illustration, only three serially connected filters are shown in FIG. 4; of course, more than three or less than three may be used where different order filtering systems must be realized.

Figure 5A:
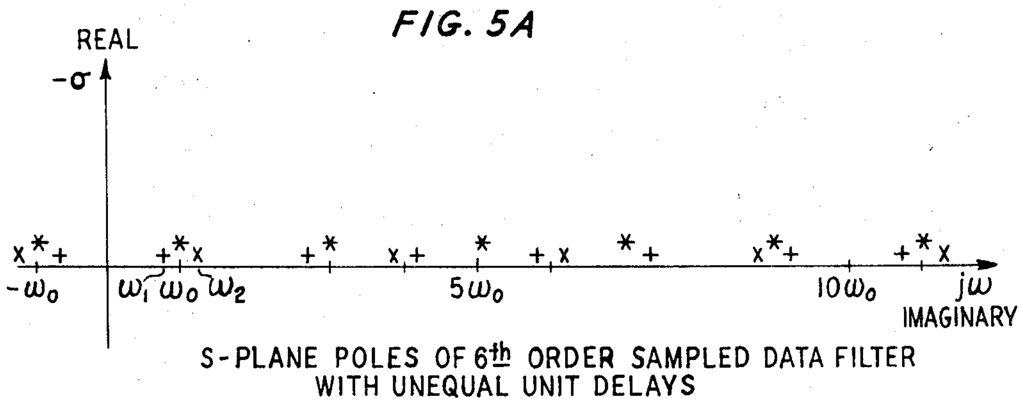
FIG. 5 illustrates the pole diagram and frequency response of the filter depicted in FIG. 4.
Figure 5B:
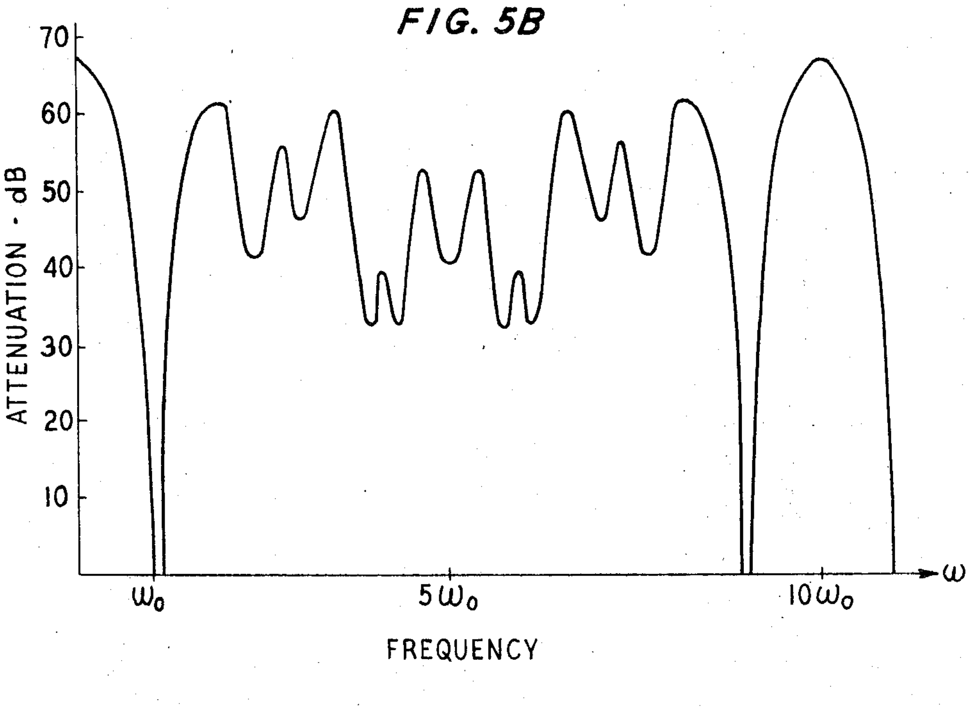

It has been further discovered that the magnitude of frequency components passed through this filter, at frequencies other than the desired passband, may be further substantially reduced by using a different value of unit delay $\tau_1$, $\tau_2$, etc., in each cascaded second-order section. Thus, the delay units 10 and 20 of filter 21 would have a unit delay interval $\tau_1$ of LT, the delay units of filter 22 would exhibit a unit delay interval $\tau_2$ of MT, and the delay interval $\tau_3$ of filter 23 would be a unit delay of NT, where $L \neq M \neq N$ are integers. FIG. 5 depicts the pole locations and frequency response of the filter of FIG. 4 for the values L=5, M=6, N=4, and $T=\pi/10w_o$, where $w_o$ is the passband center frequency. The three different symbols +, *, ×, in FIG. 5A designate the poles, respectively, of the three second-order sections 21, 22, and 23 of FIG. 4. Since the poles $w_1$, $w_o$, and $w_2$ are periodic at different frequencies, the frequency response of the filter is altered from that of FIG. 2B, as shown in FIG. 5B. Comparing the response shown in FIG. 5B with that shown in FIG. 2B, it is clear that the passbands at frequencies $3w_o$, $5w_o$, and $7w_o$ have been eliminated. As discussed above, by strategically locating, in a well-known manner, zeros at frequencies $4w_o$, $6w_o$, and $9w_o$, the most prominent attenuation minima shown in FIG. 5B will also be eliminated. It has been found that the overall worst case sensitivity (the sum of the absolute values of the sensitivities of the $jw$ axis coordinates of the poles to all filter coefficients) of a sixth-order Butterworth band-pass filter with a 10 percent bandwidth, implemented in accordance with this invention, is only one-ninetieth of that of an equivalent system which was designed using prior art techniques. The improved performance of the filter of this invention is evident.

It is to be understood that the embodiments shown and described herein are illustrative of the principles of this invention only, and that modifications of this invention may be implemented by those skilled in the art without departing of the scope and spirit of the invention. For example, diverse embodiments of a specific $n$th order discrete-time filter are known in the prior art. In all such embodiments unit delays must necessarily be used. The principles of this invention are, of course applicable to such filters.

What I claim is:

1. A discrete-time filter having multipliers, summing networks and unit delay elements connected in a predetermined circuit relationship for processing an applied signal sampled at predetermined intervals of time, T, characterized in that, at least one of said unit delay elements delays an applied signal an interval of time, $\tau$, which is an integer multiple, other than unity, of said sampling interval, T.

2. A discrete-time filter having at least one coefficient multiplier, at least one summing network, and at least one delay element connected in predetermined circuit relationship for processing an applied signal sampled at intervals of time, T, wherein said delay element has an interval of unit time delay, $\tau$, which is an integral multiple, other than unity, of said sampling interval, T.

3. A discrete-time filter comprising:

a summing network responsive to an applied input signal sampled at intervals of time t;

a coefficient network for multiplying applied signals;

unit delay means, connecting the output of said summing network and the input of said coefficient network, having a value of time delay, $\tau$, which is an integer multiple, other than unity, of said sampling interval, T;

and means for applying the output signal of said coefficient network to said summing network.

4. A discrete-time filter for processing applied signals sampled at intervals of time, T, comprising:

a first summing network responsive to said applied sampled signals;

a first unit delay network for delaying signals emanating from said summing network an interval of time, $\tau$, which is an integer multiple, other than unity, of said sampling interval, T;

a first coefficient network for multiplying said delayed signals;

and first means for applying said multiplied delayed signals to said summing network.

5. A discrete-time filter as defined in claim 4 further comprising: a second summung network;

a second unit delay network for delaying signals emanating from said first unit delay network an interval of time, $\tau$, which is an integer multiple, other than unity, of said sampling interval, T;

a second coefficient network for multiplying signals delayed by said second unit delay network;

second means for applying output signals of said second coefficient network to said first summing network;

a third coefficient network for multiplying signals emanating from said first summing network;

a fourth coefficient network for multiplying signals delayed by said first unit delay network;

a fifth coefficient network for multiplying signals delayed by said second unit delay network;

and means for applying said multiplied signals of said third, fourth, and fifth coefficient networks to said second summing network.

6. A discrete-time filter system comprising the cascade connection of a plurality of discrete-time filters wherein the unit time delay $\tau$ of at least one of said filters is an integer multiple, other than unity, of the sampling interval T of an applied signal.

7. A discrete-time filter system as defined in claim 6 wherein all of said filters have unit time delays unequal to the sampling interval of an applied signal.

8. A discrete-time filter system as defined in claim 7 wherein said unit time delays are equal to an integer multiple, other than unity, of said sampling interval.

9. A discrete-time filter system as defined in claim 8 wherein the unit time delay of each of said filters is different from that of said other filters.

10. A discrete-time filter system as defined in claim 6 wherein said filters are second-order discrete-time filters.